US008818090B2

(12) United States Patent
Kishimoto

(10) Patent No.: US 8,818,090 B2
(45) Date of Patent: Aug. 26, 2014

(54) COLOR PROCESSING APPARATUS AND COMPUTER READABLE MEDIUM STORING PROGRAM

(75) Inventor: Yasunari Kishimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 439 days.

(21) Appl. No.: 12/874,611

(22) Filed: Sep. 2, 2010

(65) Prior Publication Data
US 2011/0235907 A1  Sep. 29, 2011

(30) Foreign Application Priority Data

Mar. 26, 2010  (JP) ................................ 2010-071675

(51) Int. Cl.
*G06K 9/00* (2006.01)

(52) U.S. Cl.
USPC ........... 382/167; 382/162; 382/163; 345/601; 345/604; 358/501; 358/508

(58) Field of Classification Search
USPC ........... 382/167, 162, 274, 168, 163; 358/1.9, 358/518, 519, 520, 521, 522, 523, 500, 358/501; 345/590, 604, 591, 603, 601
See application file for complete search history.

(56) References Cited

U.S. PATENT DOCUMENTS

| | | | | |
|---|---|---|---|---|
| 5,881,211 A * | 3/1999 | Matsumura | .................... | 358/1.9 |
| 6,301,383 B1 * | 10/2001 | Ito et al. | ........................ | 382/162 |
| 6,340,975 B2 * | 1/2002 | Marsden et al. | ............... | 345/590 |
| 6,373,595 B1 * | 4/2002 | Semba et al. | .................. | 358/1.9 |
| 6,532,081 B1 * | 3/2003 | Cecchi et al. | .................. | 358/1.9 |
| 6,720,973 B2 * | 4/2004 | Butler | ........................... | 345/604 |
| 6,724,507 B1 * | 4/2004 | Ikegami et al. | ............... | 358/518 |
| 6,859,551 B2 * | 2/2005 | Ohga | ............................. | 358/1.9 |
| 7,027,067 B1 * | 4/2006 | Ohga | ............................. | 345/589 |
| 7,158,146 B2 * | 1/2007 | Ohga | ............................. | 345/589 |
| 7,193,746 B2 | 3/2007 | Kanai | | |
| 7,787,149 B2 * | 8/2010 | Ichitani | ......................... | 358/1.9 |
| 7,809,187 B2 * | 10/2010 | Shimbaru | ..................... | 382/162 |
| 7,830,567 B2 * | 11/2010 | Higashikata et al. | ......... | 358/518 |
| 7,969,628 B2 * | 6/2011 | Kim et al. | ..................... | 358/518 |
| 8,045,222 B2 * | 10/2011 | Shirasawa | ..................... | 358/1.9 |
| 8,111,423 B2 * | 2/2012 | Miyahara et al. | .............. | 358/1.9 |
| 8,237,751 B2 * | 8/2012 | Belik | ............................ | 345/690 |
| 8,493,465 B2 * | 7/2013 | Ohga | ......................... | 348/222.1 |
| 2001/0012920 A1 * | 8/2001 | Ren et al. | ....................... | 600/587 |
| 2001/0017627 A1 * | 8/2001 | Marsden et al. | .............. | 345/501 |
| 2003/0016862 A1 * | 1/2003 | Ohga | ........................... | 382/162 |
| 2003/0228055 A1 * | 12/2003 | Kanagawa et al. | ........... | 382/162 |
| 2004/0239971 A1 * | 12/2004 | Kim | ............................... | 358/1.9 |

(Continued)

FOREIGN PATENT DOCUMENTS

JP   B2-3635673       4/2005
WO   WO 2009113306 A1 *  9/2009  ............... G06T 1/00

*Primary Examiner* — Mekonen Bekele
(74) *Attorney, Agent, or Firm* — Oliff PLC

(57) ABSTRACT

A color processing apparatus includes an obtaining unit that obtains a first color signal from outside, a converting unit that converts the first color signal obtained by the obtaining unit into a second color signal based on a viewing condition, and a generating unit that generates a third color signal on the basis of the first color signal obtained by the obtaining unit and the second color signal obtained through conversion performed by the converting unit, the third color signal being an input signal that is used for a color gamut mapping process of performing mapping to a color gamut of an output device.

11 Claims, 5 Drawing Sheets

(56) References Cited

U.S. PATENT DOCUMENTS

| | | | |
|---|---|---|---|
| 2007/0003136 A1* | 1/2007 | Shimbaru | 382/167 |
| 2007/0058185 A1* | 3/2007 | Kawai | 358/1.9 |
| 2007/0223810 A1* | 9/2007 | Sekine | 382/162 |
| 2007/0279714 A1* | 12/2007 | Higashikata et al. | 358/518 |
| 2008/0037041 A1* | 2/2008 | Hasegawa et al. | 358/1.6 |
| 2009/0213136 A1* | 8/2009 | Desjardins et al. | 345/594 |
| 2011/0012920 A1* | 1/2011 | Saigo et al. | 345/601 |
| 2013/0033517 A1* | 2/2013 | Choi et al. | 345/593 |
| 2014/0002481 A1* | 1/2014 | Broughton et al. | 345/591 |

* cited by examiner

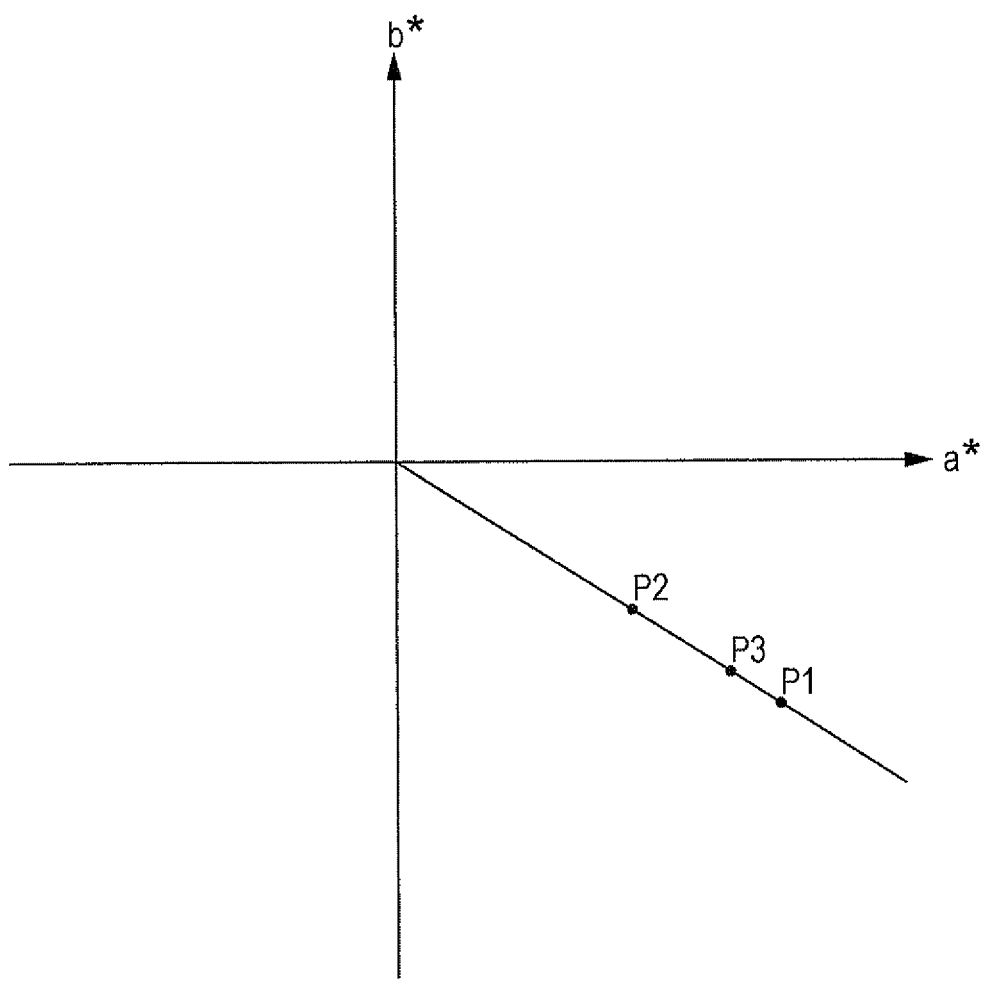

COLOR PROCESSING APPARATUS AND COMPUTER READABLE MEDIUM STORING PROGRAM

CROSS-REFERENCE TO RELATED APPLICATIONS

This application is based on and claims priority under 35 USC 119 from Japanese Patent Application No. 2010-071675 filed Mar. 26, 2010.

BACKGROUND (i) Technical Field

The present invention relates to a color processing apparatus and a computer readable medium storing a program.

SUMMARY

According to an aspect of the invention, there is provided a color processing apparatus including an obtaining unit that obtains a first color signal from outside, a converting unit that converts the first color signal obtained by the obtaining unit into a second color signal based on a viewing condition, and a generating unit that generates a third color signal on the basis of the first color signal obtained by the obtaining unit and the second color signal obtained through conversion performed by the converting unit, the third color signal being an input signal that is used for a color gamut mapping process of performing mapping to a color gamut of an output device.

BRIEF DESCRIPTION OF THE DRAWINGS

Exemplary embodiment(s) of the present invention will be described in detail based on the following figures, wherein:

FIG. 2 is a diagram for explaining a situation where colors obtained by shifting reproduced colors generated by using a monitor color prediction model (color characterization model) in a direction where the chroma increases are more similar to colors of a printed image;

DETAILED DESCRIPTION

Figure 1A:
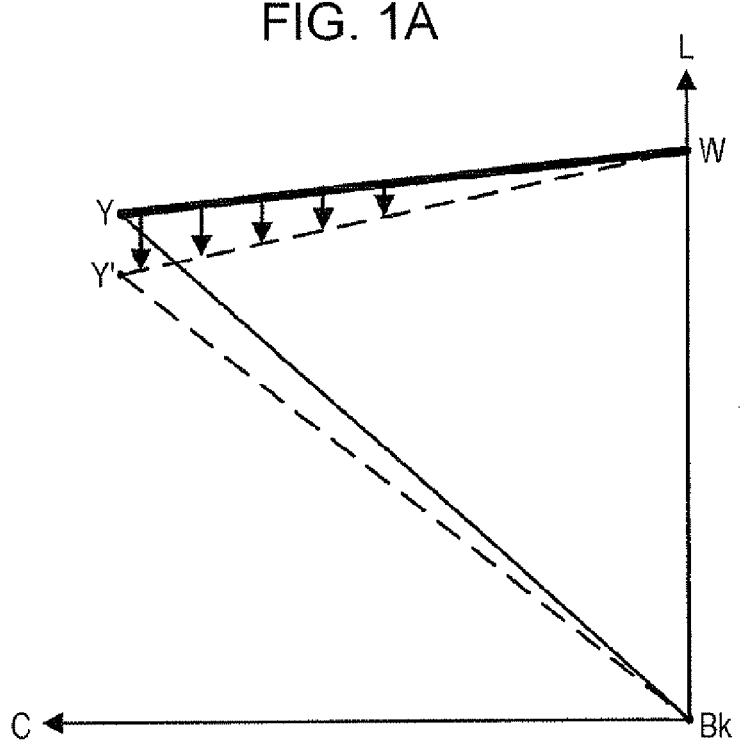
FIGS. 1A and 1B are diagrams for explaining a situation where yellow gradation has a murky color when a monitor color prediction model is used.

Hereinafter, an exemplary embodiment of the invention will be described in detail with reference to the attached drawings.

First, an overview of the exemplary embodiment of the invention will be described.

In order to achieve matching between different device color spaces, a color conversion process is necessary, which is performed particularly with a color gamut mapping algorithm (color gamut mapping process) and a color prediction model (color characterization). Here, in an output device that performs printing or digital printing, for example, a color space including colors of four or more inks (color materials) including black as color components is used as a device color space, for example. In an input device such as a monitor or camera, an RGB color space or the like is used. Furthermore, a color space used to achieve matching between different device color spaces is a color space that is independent of a device color space. As such a color space, tristimulus values CIEXYZ, color stimulus values LMS, or the like may be used. Also, a CIELAB space or a CIECAM02 space (Jch or the like) that may be handled in terms of perception characteristics (using lightness, chroma, and hue) is often used. Thus, the color gamut mapping algorithm may be referred to as an algorithm for determining colors corresponding to each other between two devices in the CIELAB space, the CIECAM02 space, or the like. Furthermore, a color conversion coefficient for color conversion (color profile) has color information configured in accordance with a usage form, and there are a device link form based on a device signal as an input and an International Color Consortium (ICC) profile form in which a CIEXYZ space, a CIELAB space, or the like independent of a device color space is used. In the exemplary embodiment, the device link form may of course be applied, and even the ICC profile form, in which the actual input device is not specified, may be applied as well when a certain input device (or virtual device) is assumed.

The color prediction model is used to predict two color conversions from a device color space to a device-independent color space. Particularly, a color prediction model for a monitor (hereinafter referred to as "monitor color prediction model") in a case where a monitor is used as a device is used to convert reproduced colors corresponding to a signal input to the monitor into reproduced colors displayed on the monitor. Therefore, in the monitor color prediction model, a condition regarding an environment in which a monitor surface is observed (observation environment condition) is used. The observation environment condition includes various elements, such as ambient light that influences the monitor surface, the colors of clothes of an observer, and the color of a desk on which the monitor is placed. In the monitor color prediction model, elements that influence display on the monitor among those elements are modeled. An example of a typical form of storing information of the monitor color prediction model is a monitor profile compatible with the ICC (ISO 15076-1). In the monitor profile, reproduced colors under a predetermined observation environment condition are stored, and thus it may be necessary to perform color processing for correcting reproduced colors regarding an actual white point (luminance or chromaticity) on the monitor and illumination of the observation environment. The color processing may be included in a form of the monitor color prediction model.

Even under the assumption that reproduced colors are obtained using such a monitor color prediction model, a difference in color gamut exists between devices, and thus the color gamut mapping algorithm is necessary.

In the color gamut mapping algorithm, a color difference minimum algorithm may be used when a difference in color gamut between devices is small. However, when the difference in color gamut is large, an algorithm in which the inside of the color gamut is maintained, gradation is emphasized, and contradictory elements are matched is necessary in the case of reproduction in a photograph. Perceptual reproduced colors are three-dimensionally expressed, but it is difficult to deal with three dimensions at a time, and thus several basic methods are adopted to deal with this. A first method is a method for performing two-dimensional lightness/chroma mapping on three-dimensional input colors while fixing the hue thereof, thereby determining corresponding colors as a result of the mapping. A second method is a method for one-dimensionally mapping chroma with lightness being constant or one-dimensionally mapping lightness and chroma, while maintaining the hue by using color gamut periphery information that describes a boundary between the inside and outside of the color gamut and a reference fixed point (achromatic lightness axis in many cases).

However, some problems arise in a case where color gamut mapping is performed by generating reproduced colors (second input colors described below) similar to the colors displayed on the monitor from input colors (first input colors described below) corresponding to a signal input to the monitor by using the monitor color prediction model.

A first problem is that, when the monitor color prediction model is used, a relative luminance of standardized white of a monitor signal (with a lightness of 100 and a chroma of 0) is color-converted to a white point on a sheet and also a yellow lightness of the monitor signal (any one of yellow gradation levels) is within the color gamut of an output device, so that the yellow gradation may have a murky color.

Figure 1B:
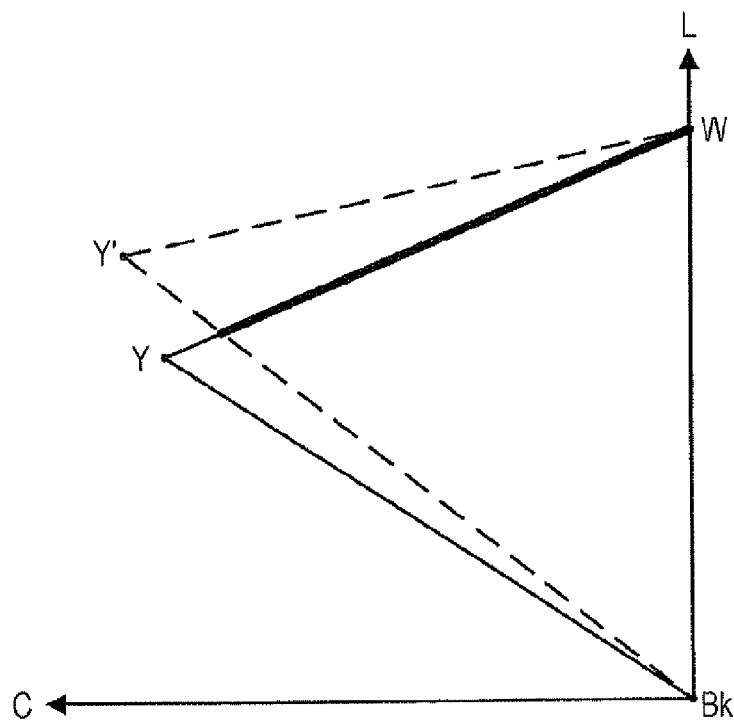

FIGS. 1A and 1B are diagrams for explaining such a situation.

Here, the vertical axis indicates lightness (L) and the horizontal axis indicates chroma (C). A solid line indicates the color gamut of the monitor, and a broken line indicates the color gamut of the output device. In each color gamut, the point with the lowest lightness corresponds to black (Bk), the point with the highest lightness corresponds to white (W), and the point with the highest chroma corresponds to yellow (Y and Y').

In FIG. 1A, the solid line indicates the color gamut of input colors corresponding to a signal input to the monitor. In this case, by shifting the portion of yellow gradation indicated by the bold line downward as indicated by arrows, yellow may be kept pure and murkiness of yellow gradation may be suppressed without the necessity of complicated processing.

On the other hand, in FIG. 1B, the solid line indicates the color gamut of reproduced colors that are generated by using the monitor color prediction model and that are similar to the colors displayed on the monitor. In this case, the portion indicated by the bold line is a portion of murky yellow gradation. In order to change the murky color, complicated processing including exceptional processing (extension of the color gamut in a part) is necessary.

A second problem has been found through a subjective evaluation experiment. That is, a situation may occur in which colors generated by shifting reproduced colors that are generated by using the monitor color prediction model and that are similar to the colors displayed on the monitor in a direction where the chroma increases between the reproduced colors and the input colors corresponding to a signal input to the monitor are more similar to the colors in a printed image (or are subjectively appropriate).

FIG. 2 is a diagram for explaining such a situation.

Here, the horizontal axis indicates a*, and the vertical axis indicates b*. Also, input colors corresponding to a signal input to the monitor are represented by point P1, and reproduced colors that are generated using the monitor color prediction model and that are similar to the colors displayed on the monitor are represented by point P2. In this case, there are reproduced colors represented by point P3, which has a higher chroma than that in point P2, and the reproduced colors may be optimum. However, complicated processing such as expansion of a color gamut is necessary to determine the optimum reproduced colors (point P3) on the basis of the reproduced colors similar to the colors displayed on the monitor (point P2).

A third problem is that, when a monitor color prediction model in which a flare component is easily added is used, a low-lightness region is lighter than in the case of not using the model. Another finding obtained in addition to the second problem through the subjective evaluation experiment is that reproduced colors that are more similar to the colors perceived by the eye may be obtained as the lightness becomes lower (more similar to the first input colors described below).

Accordingly, in the exemplary embodiment, preprocessing of color gamut mapping is performed to eliminate the necessity for performing complicated processing, such as gamut mapping with expansion of color data, in a case where color gamut mapping is performed on the basis of reproduced colors that are generated using the monitor color prediction model and that are similar to the colors displayed on the monitor. Specifically, reproduced colors on the monitor and reproduced colors of a printed image are made to be similar to each other, and a color conversion coefficient for preventing murkiness and failure is generated for yellow gradation.

Hereinafter, a color processing apparatus that performs the foregoing operation will be described in detail.

Figure 3:
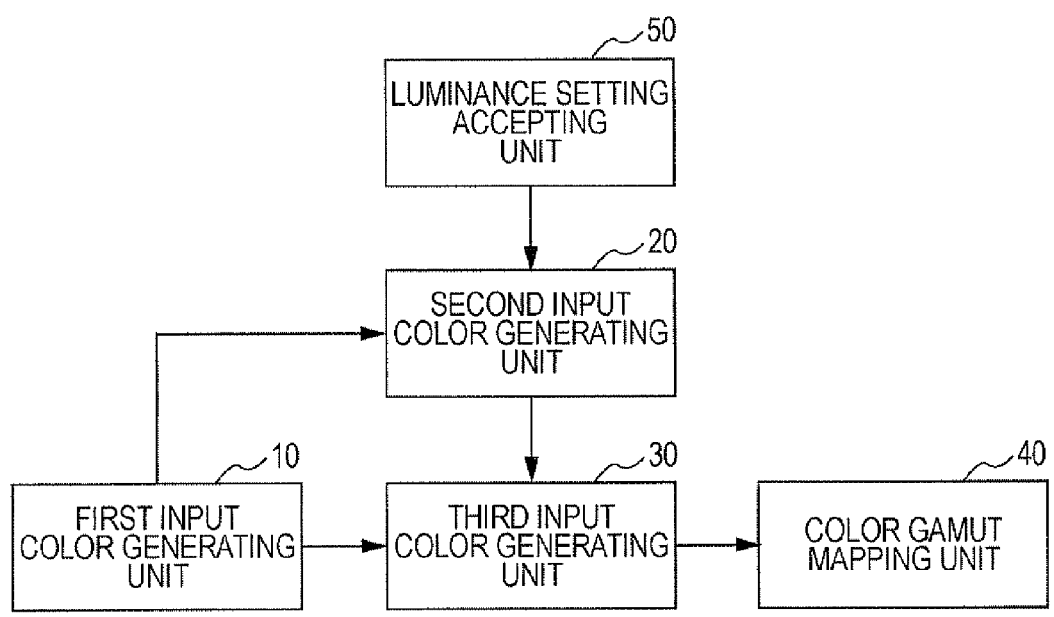
FIG. 3 is a diagram illustrating a configuration example of a color processing apparatus according to an exemplary embodiment of the invention.

FIG. 3 is a diagram illustrating an example of a functional configuration of the color processing apparatus according to the exemplary embodiment.

The color processing apparatus illustrated in FIG. 3 has a color gamut mapping function that is used to output colors displayed on a monitor to a printer. Here, an RGB signal is used as a monitor device signal, and a CMYK signal is used as a printer device signal. Alternatively, other color spaces may be used for the respective signals. Also, a CIEXYZ color space, which is a device-independent color space, is used as an example of a color space for use in color gamut mapping, but a CIELAB color space may also be used. Furthermore, a color space having a characteristic of perceptually equal hue, such as a CIECAM02 color space, is more appropriate.

As illustrated in FIG. 3, the color processing apparatus according to the exemplary embodiment includes a first input color generating unit 10, a second input color generating unit 20, a third input color generating unit 30, a color gamut mapping unit 40, and a luminance setting accepting unit 50.

The first input color generating unit 10 receives an RGB signal serving as a monitor device signal, and calculates a corresponding CIEXYZ color space. Here, an existing ICC display device profile (v2) or ICC Colorspace conversion profile (v4) may be used for calculating the CIEXYZ color space. In any case, a CIEXYZ color space in a D50 profile connection space (PCS) may be obtained by using the ICC profile. If the correspondence between the RGB signal and the CIEXYZ color space is defined in a standard, a color conversion process based on the standard may be used. The first input color generating unit 10 obtains input colors (first input colors) in the CIEXYZ color space from the RGB signal serving as a monitor device signal by using any of the foregoing methods. In the exemplary embodiment, first input colors are used as an example of a first color signal, and the first input color generating unit 10 is provided as an example of an obtaining unit that obtains the first color signal and a first generating unit that generates the first color signal.

The second input color generating unit 20 converts the first input colors generated by the first input color generating unit 10 into input colors (second input colors) in the CIEXYZ color space similar to the colors displayed on the monitor by using a monitor color prediction model. Here, the monitor color prediction model is used to change the standardized input colors (first input colors) in the CIEXYZ color space to colors in the CIEXYZ color space based on a white point under a viewing condition. For example, if at least luminance Y at a white point on the monitor in the observation environment condition is adjusted to that at a white point on a sheet, the white point on the sheet may be used as a reference white point. In principle, the CIEXYZ color space has a value standardized with Y at a white point (the point with the highest lightness or white causing chromatic adaptation). Thus, when two devices exist, a mechanism for calculating reproduced colors by re-standardizing the value in accordance with the observation environments assumed for the respective devices is necessary. Information about the observation environments used for the calculation is a relationship between absolute luminances Y at the respective white points (or XYZ at the respective white points) or between relative luminances Y. If the relationship is determined to some extent, an approximately similar state may be reproduced. Measurement is necessary to strictly reproduce the state, but a measurement device is expensive and the measurement takes time.

Accordingly, in the exemplary embodiment, a monitor color prediction model is set using the following linear expression.

$$\left.\begin{array}{l} X_2 = A_X X_1 + B_X \\ Y_2 = A_Y Y_1 + B_Y \\ Z_2 = A_Z Z_1 + B_Z \end{array}\right\} \quad \text{Expression 1}$$

$(X_1, Y_1, Z_1)$: XYZ value of first input colors $(X_2, Y_2, Z_2)$: XYZ value of second input colors $A_X, A_Y, A_Z$: ratio between two white points $B_X, B_Y, B_Z$: flare when black is displayed on monitor A description has been given about the case of using a CIEXYZ color space. Alternatively, reproduced colors similar to the colors displayed on the monitor may be obtained directly from the RGB signal, instead of the CIEXYZ color space, in accordance with the monitor color prediction model basically based on linear behavior, that is, based on addition and calculation in a matrix. Also, another monitor color prediction model that does not use a matrix may be set depending on required accuracy. However, measurement information for plural reproduced colors is necessary in many cases, which is not practical unless a monitor color prediction model is used by designing it in advance.

The second input color generating unit 20 may use, as the second input colors, input colors that are generated by relatively converting the first input colors by using a white point on a sheet as a reference white point. This corresponds to the case of using a monitor color prediction model of predicting the colors displayed on the monitor in a light-room condition from the colors displayed on the monitor in a substantially dark-room condition (first input colors).

In the exemplary embodiment, second input colors are used as an example of a second color signal, and the second input color generating unit 20 is provided as an example of a converting unit that converts a first color signal into a second color signal and a second generating unit that generates the second color signal.

The third input color generating unit 30 generates third input colors on the basis of first input colors and second input colors. This is because the second input colors may be inappropriate due to the limit of the color gamut of an output device.

For example, in an output device, yellow gradation without murkiness (mixed color) is favorable, and thus it is desirable that reproduced colors in the color gamut of an input device are caused to generally match the corresponding colors in the color gamut of the output device. In the exemplary embodiment, yellow gradation in input colors is set in the outside of the color gamut of the output device because determination of corresponding colors is controlled more easily when the yellow gradation in the input colors does not exist in the color gamut of the output device. Specifically, a first input color is adopted as a third input color for pure yellow, and a second input color is adopted as a third input color for the other colors. Note that, in order to prevent discontinuity between the former state and the latter state, in the neighborhood of a portion where a first input color is adopted as a third input color, the third input color is generated by mixing the first input color and a second input color at a ratio based on the degree of deviation from the first input color (difference in color or difference in lightness and chroma) of the yellow gradation of the first input color in the neighborhood, for example.

Also, as a result of experimental consideration, there exists a region where it is determined that the first input color is more similar to the color displayed on the monitor than the second input color in part of a color region. Specifically, the first input color seems to be more similar to the color displayed on the monitor or seems to be more favorable as the chroma becomes higher. This is as a result of considering the continuity to the color gamut of the output device. Thus, the first input color is set as the third input color, and the third input color is generated by mixing the first input color fx and the second input color in the neighborhood thereof.

In this specification, "neighborhood" of a certain color is part of a color space that is formed of a color of which distance from the certain color is shorter than a predetermined threshold.

Also, the third input color generating unit 30 may cause the third input colors to be more similar to the second input colors as a portion that is in the color gamut of the input device and that is outside the color gamut of the output device is smaller. Specifically, the color gamut of the input device is compared with the color gamut of the output device, and the ratio at which the first input colors and the second input colors are mixed is changed in accordance with the size of the color gamut of the input device outside the color gamut of the output device. Plural methods according to the related art may be used as a method for determining the difference in size between color gamuts. For example, a method for comparing the volumes of differences in color gamuts in units of color regions may be used to determine the difference in detail, and a method for determining a difference in chroma or color between reproduced colors on the periphery of the color gamut of the input device and reproduced colors on the periphery of the color gamut of the output device may be used as a simple method.

Furthermore, the third input color generating unit 30 may analyze the color gamut of an image as a target of color conversion, and may cause the third input colors to be more similar to the second input colors as the frequency of reproduced colors outside the color gamut of the output device is lower. Specifically, after a process of estimating the color gamut that is used in the image, if the color gamut does not have a large difference with respect to the color gamut of the output device or if the color gamut has no yellow gradation, the second input colors are adopted in a process of setting the third input colors.

Also, the third input color generating unit 30 may set the hue of the second input colors as the hue of the third input colors. That is, basically, colors similar to those displayed on the monitor may be reproduced by using a monitor color prediction model, but it is considered that there exists a region where it is desirable to use the first input colors in view of a color gamut difference or color gamut mapping. Note that large issues here are lightness and chroma. In the case of using one-dimensional lightness/chroma mapping, a method for using the hue of the second input colors or a method for relying on a mechanism of determining the hue in the color gamut mapping unit 40 (described below) may be adapted for hue.

Furthermore, the third input color generating unit 30 may not set the lightness of the second input colors with respect to the lightness of the third input colors that is related for use in yellow gradation in a direct or interpolation manner. This is based on the consideration that, in the case of a mechanism corresponding to the form of the ICC profile (B2A in ICC output device profile), color gamut mapping for reproduced colors on lattice points on the PCS is necessary and it is necessary to generate yellow gradation through interpolation.

In the exemplary embodiment, third input colors are used as an example of a third color signal, and the third input color generating unit 30 is provided as an example of a generating unit and a third generating unit that generate the third color signal.

The color gamut mapping unit 40 performs color gamut mapping on the third input colors. Here, any existing method may be used for color gamut mapping. For example, lightness/chroma mapping in one direction using a reference fixed point (hue is fixed) may be used. In the exemplary embodiment, the color gamut mapping unit 40 is provided as an example of a mapping unit that maps a color signal in a color space depending on a first device to the color gamut of a second device.

When at least a luminance of the monitor in ambient light is input through a user interface (not illustrated) as a viewing condition for setting the second input colors, the luminance setting accepting unit 50 accepts the input luminance. The accepted luminance is used to cause the colors displayed on the monitor and the colors of printed material to be similar to each other by changing $B_X$, $B_Y$, and $B_Z$ in expression 1 in the second input color generating unit 20. Here, only Y of the CIEXYZ color space may be input as the luminance, or XYZ may be input. In the exemplary embodiment, the luminance setting accepting unit 50 is provided as an example of an accepting unit that accepts a luminance.

Next, operation of the color processing apparatus according to the exemplary embodiment will be described.

When an RGB signal is input from outside to the color processing apparatus, the first input color generating unit 10 receives the RGB signal and converts it to a CIEXYZ color space, thereby generating first input colors. Then, the first input color generating unit 10 outputs the first input colors to the second input color generating unit 20 and the third input color generating unit 30.

The second input color generating unit 20 receives the first input colors from the first input color generating unit 10 and converts them by using a monitor color prediction model based on the luminance accepted by the luminance setting accepting unit 50, for example, thereby generating second input colors. Then, the second input color generating unit 20 outputs the second input colors to the third input color generating unit 30.

Accordingly, operation of the third input color generating unit 30 starts.

Figure 4:
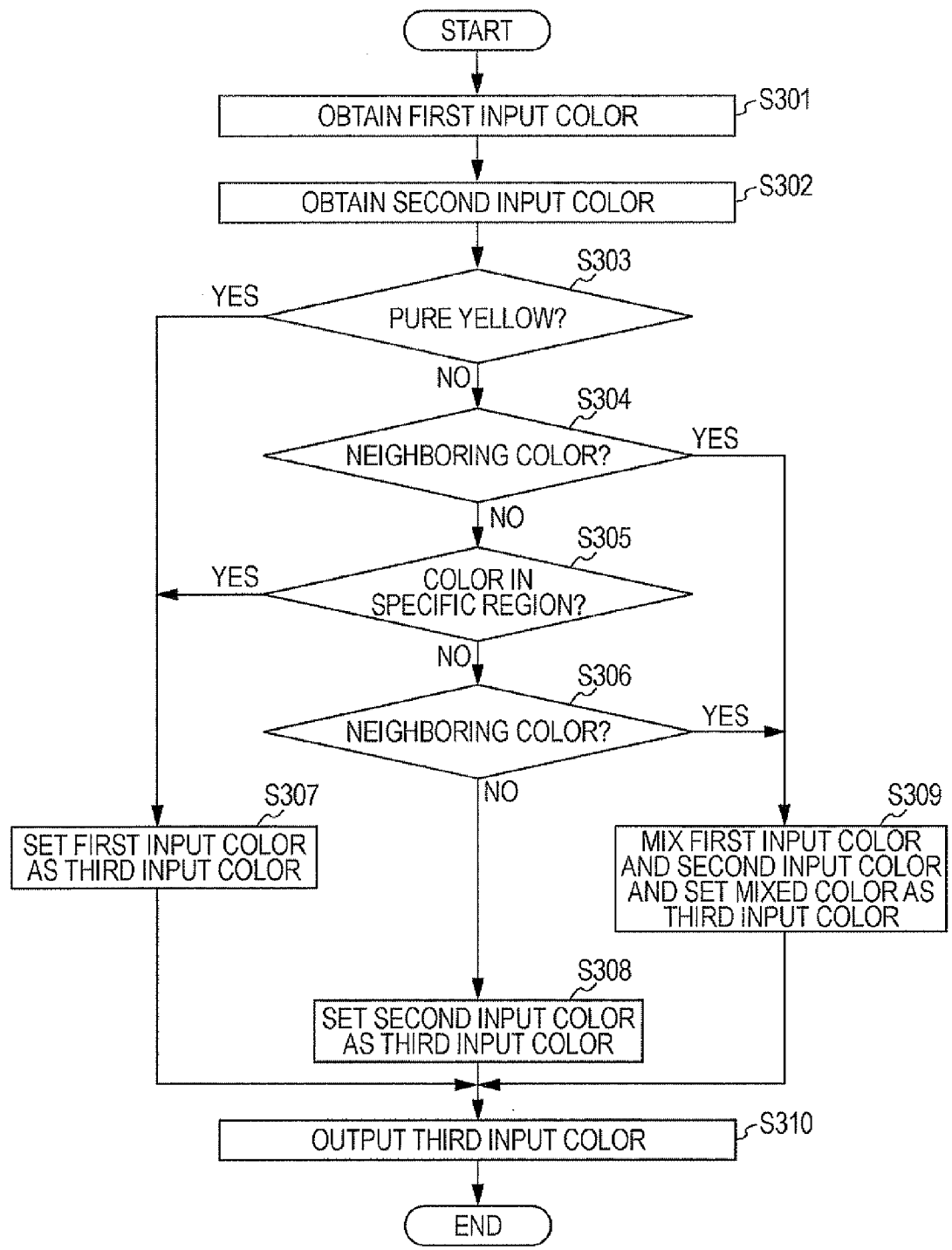
FIG. 4 is a flowchart illustrating an operation example of a third input color generating unit in the color processing apparatus according to the exemplary embodiment of the invention.

FIG. 4 is a flowchart illustrating an operation example of the third input color generating unit 30. Here, a description will be given of only a basic process performed by the third input color generating unit 30, that is, a process for removing murkiness of yellow gradation and a process performed in a region where a first input color is determined to be more similar to a color displayed on the monitor than a second input color (specific region). However, the foregoing other processes of the third input color generating unit 30 may be combined to this basic process.

After the operation starts, the third input color generating unit 30 obtains a first input color output from the first input color generating unit 10 (step 301) and also obtains a second input color output from the second input color generating unit 20 (step 302).

Subsequently, the third input color generating unit 30 determines whether the first input color is pure yellow or not (step 303).

If it is determined that the first input color is pure yellow, the third input color generating unit 30 sets the first input color as a third input color (step 307).

On the other hand, if it is determined that the first input color is not pure yellow, the third input color generating unit 30 determines whether the first input color is a neighboring color thereof or not (step 304). If the first input color is a neighboring color, the third input color generating unit 30 mixes the first input color and the second input color by applying weight in accordance with the degree of neighborhood, and sets the mixed color as the third input color (step 309).

If it is determined in step 304 that the first input color is not a neighboring color of pure yellow, the third input color generating unit 30 determines whether the first input color is a color in the specific region (step 305).

If it is determined that the first input color is a color in the specific region, the third input color generating unit 30 sets the first input color as the third input color (step 307).

On the other hand, if it is determined that the first input color is not a color in the specific region, the third input color generating unit 30 determines whether the first input color is a neighboring color thereof or not (step 306). If the first input color is a neighboring color, the third input color generating unit 30 mixes the first input color and the second input color by applying weight in accordance with the degree of neighborhood, and sets the mixed color as the third input color (step 309). If the first input color is not a neighboring color, the third input color generating unit 30 sets the second input color as the third input color (step 308).

Finally, the third input color generating unit 30 outputs the third input color, which is the first input color set in step 307, the second input color set in step 308, or the mixed color obtained by mixing the first and second input colors in step 309, to the color gamut mapping unit 40 (step 310).

Accordingly, the color gamut mapping unit 40 receives the third input color from the third input color generating unit 30 and performs color gamut mapping on the third input color by using an existing method.

In the exemplary embodiment, the apparatus in which the color processing apparatus is realized is not particularly limited. The color processing apparatus may be realized in an image forming apparatus or in a general-purpose computer.

Hereinafter, a description will be given of a hardware configuration of a computer 90 serving as a general-purpose computer.

Figure 5:
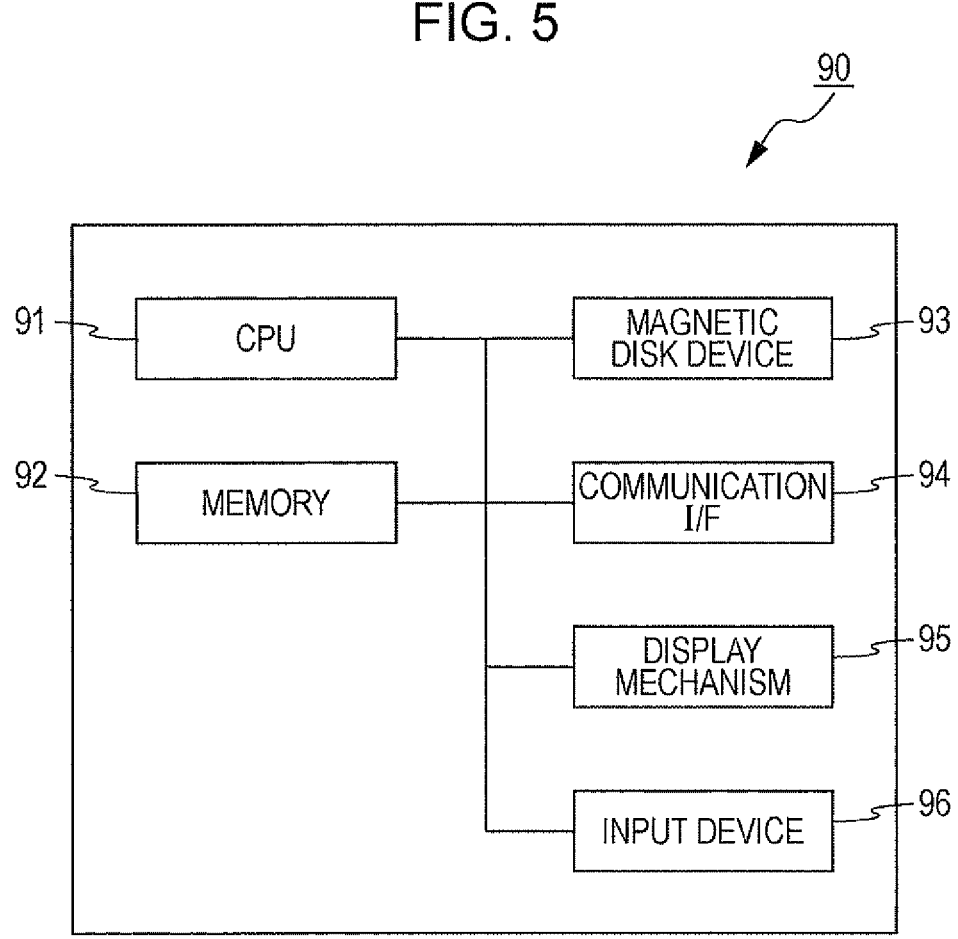
FIG. 5 is a diagram illustrating a hardware configuration of a computer capable of realizing the exemplary embodiment of the invention.

FIG. 5 is a diagram illustrating the hardware configuration of the computer 90.

As illustrated in FIG. 5, the computer 90 includes a central processing unit (CPU) 91 serving as a processing unit, and a memory 92 and a magnetic disk device (hard disk drive (HDD)) 93 serving as storage units. Here, the CPU 91 executes various types of software, such as an operating system (OS) and an application, thereby realizing the foregoing functions. The memory 92 is a storage area that stores various types of software and data used for executing the software. The magnetic disk device 93 is a storage area that stores data input to the various types of software and data output from the software.

Furthermore, the computer 90 includes a communication interface (I/F) 94 for performing communication with outside, a display mechanism 95 including a video memory and a display, and an input device 96 such as a keyboard and a mouse.

The program that realizes the exemplary embodiment may be provided by being stored in a recording medium, such as a compact disc read only memory (CD-ROM), as well as through a communication unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
    an obtaining unit that obtains an input color signal from an input device and that generates a first color signal based on the input color signal;
    a converting unit that converts the first color signal generated by the obtaining unit into a second color signal based on a viewing condition of the input device; and
    a generating unit that receives the first color signal and the second color signal and that, based upon a determination of relative appropriateness of the first color signal and the second color signal, generates a third color signal that is either the first color signal, the second color signal, or a mixture of the first and second color signals, the third color signal being an input signal of a color gamut mapping process of performing mapping to a color gamut of an output device,
    the generating unit generating the third color signal so that the third color signal becomes more similar to the second color signal as a portion outside the color gamut of the output device in a color gamut of the input device or a color reproduction range in the input color signal become smaller, and
    the obtaining by the obtaining unit, the converting by the converting unit, and the generating by the generating unit comprising a preprocessing of the color gamut mapping process,
    wherein the generating unit generates the third color signal based upon a result of a comparison between the similarity of a color of the first color signal and a color displayed by the input device and the similarity of a color of the second color signal and the color displayed by the input device.

2. The color processing apparatus according to claim 1, wherein the generating unit generates the third color signal so that the third color signal becomes more similar to the second color signal as a frequency of a reproduced color outside the color gamut of the output device among reproduced colors used in an image to be processed becomes lower.

3. The color processing apparatus according to claim 1, wherein the generating unit sets a hue of the second color signal with respect to a hue of the third color signal.

4. The color processing apparatus according to claim 1, wherein the generating unit does not set a lightness of the second color signal with respect to a lightness of the third color signal that is related for use in yellow gradation in a direct or interpolation manner.

5. The color processing apparatus according to claim 1,
    wherein the obtaining unit generates the first color signal in which an absolute white point of an observation light source serves as a reference white point, and
    wherein the converting unit relatively converts the first color signal generated by the obtaining unit into the second color signal in which a white point on a sheet serves as a reference white point.

6. The color processing apparatus according to claim 1, further comprising:
    an accepting unit that accepts at least a luminance of a screen in ambient light,
    wherein the converting unit converts the first color signal generated by the obtaining unit into the second color signal based on the luminance accepted by the accepting unit.

7. A color processing apparatus comprising:
    a mapping unit that maps a color signal in a color space that depends on a first device to a color gamut of a second device in a specific color space that is independent of a device;
    a first generating unit that generates a first color signal in the specific color space on the basis of the color signal in the color space that depends on the first device;
    a second generating unit that generates a second color signal based on a viewing condition of the first device on the basis of the first color signal generated by the first generating unit; and
    a third generating unit that receives the first color signal and the second color signal and that, based upon a determination of the relative appropriateness of the first color signal and the second color signal, generates a third color signal that is either the first color signal, the second color signal, or a mixture of the first and second color signals, the third color signal being a signal to be input to the mapping unit,
    the third generating unit generating the third color signal so that the third color signal becomes more similar to the second color signal as a portion outside the color gamut of the second device in a color gamut of the first device or a color reproduction range in the color signal in the color space that depends on the first device becomes smaller, and
    the generating by the first generating unit, the generating by the second generating unit, and the generating by the third generating unit comprising a preprocessing of the mapping by the mapping unit,
    wherein the third generating unit generates the third color signal based upon a result of a comparison between the similarity of a color of the first color signal and a color displayed by an input device and the similarity of a color of the second color signal and the color displayed by an input device.

8. A non-transitory computer readable medium storing a program causing a computer to execute a process, the process comprising:

obtaining an input color signal from an input device and generating a first color signal based on the input color signal;

converting the first color signal into a second color signal based on a viewing condition of the input device; and generating, based upon a determination of the relative appropriateness of the first color signal and the second color signal, a third color signal that is either the first color signal, the second color signal, or a mixture of the first and second color signals, the third color signal being an input signal of a color gamut mapping process of performing mapping to a color gamut of an output device, the generating step generating the third color signal so that the third color signal becomes more similar to the second color signal as a portion outside the color gamut of the output device in a color gamut of the input device or a color reproduction range in the input color signal become smaller, and the obtaining, the converting, and the generating steps comprising a preprocessing of the color gamut mapping process, wherein the third color signal is generated based upon a result of a comparison between the similarity of a color of the first color signal and a color displayed by the input device and the similarity of a color of the second color signal and the color displayed by the input device.

9. The color processing apparatus according to claim 1, wherein the third color signal is the first color signal.

10. The color processing apparatus according to claim 1, wherein the third color signal is the second color signal.

11. The color processing apparatus according to claim 1, wherein the result of the comparison is an experimental result.

* * * * *